United States Patent
Yoshinaga

(10) Patent No.: US 11,733,086 B2
(45) Date of Patent: Aug. 22, 2023

(54) ARTICLE TRANSPORT VEHICLE

(71) Applicant: Daifuku Co., Ltd., Osaka (JP)

(72) Inventor: Kazuharu Yoshinaga, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 396 days.

(21) Appl. No.: 16/972,045

(22) PCT Filed: May 27, 2019

(86) PCT No.: PCT/JP2019/020871
§ 371 (c)(1),
(2) Date: Dec. 4, 2020

(87) PCT Pub. No.: WO2019/235280
PCT Pub. Date: Dec. 12, 2019

(65) Prior Publication Data
US 2021/0239511 A1    Aug. 5, 2021

(30) Foreign Application Priority Data

Jun. 6, 2018 (JP) ................. 2018-108850

(51) Int. Cl.
*G01G 19/12* (2006.01)
*G01G 23/37* (2006.01)
*B65G 1/137* (2006.01)
*G06Q 10/08* (2023.01)
*G06Q 10/087* (2023.01)

(52) U.S. Cl.
CPC ............ *G01G 19/12* (2013.01); *B65G 1/137* (2013.01); *G01G 23/37* (2013.01); *G06Q 10/087* (2013.01)

(58) Field of Classification Search
CPC ........ G01G 19/12; G01G 23/37; B65G 1/137; G06Q 10/087
See application file for complete search history.

(56) References Cited

U.S. PATENT DOCUMENTS

2019/0138975 A1* 5/2019 Zuberi ................ G06Q 10/087

FOREIGN PATENT DOCUMENTS

| JP | H5147708 A | 6/1993 |
| JP | H881025 A | 3/1996 |
| JP | 200044021 A | 2/2000 |
| JP | 2000142928 A | 5/2000 |

(Continued)

*Primary Examiner* — Randy W Gibson
(74) *Attorney, Agent, or Firm* — The Webb Law Firm

(57) ABSTRACT

In order to suppress the collection of articles that are different from those specified when collecting articles using an article transport vehicle from a plurality of accommodating portions that accommodate articles, an article transport vehicle (3) includes a control portion (15), and a weight detecting portion (18) that detects a total weight (W) of articles (B) supported by a support portion (12), wherein articles picked up from accommodating portions (1) are supported by the support portion (12). In a case in which an increased weight (ΔW), which is an increase in the total weight (W) when an article (B) is newly supported by the support portion (12), is out of a prescribed range (WL, WH) according to a weight (BW) of a target article, which is an article (B) that is to be picked up from the accommodating portion (1), the control portion (15) determines that the target article was not correctly picked up, and makes a notification giving error information.

12 Claims, 8 Drawing Sheets

(56) References Cited

FOREIGN PATENT DOCUMENTS

| | | | |
|---|---|---|---|
| JP | 2008247546 | A | 10/2008 |
| JP | 2009241669 | A | 10/2009 |
| JP | 201271960 | A | 4/2012 |
| WO | 2018083726 | A1 | 5/2018 |

* cited by examiner

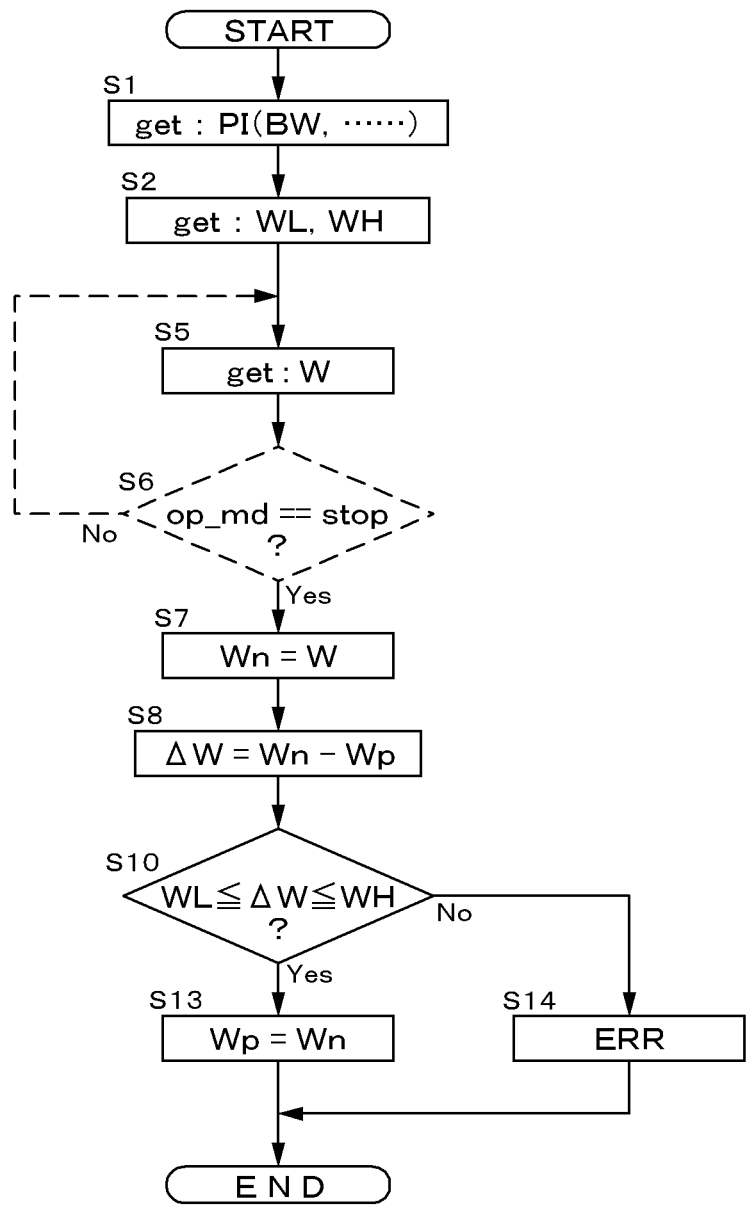

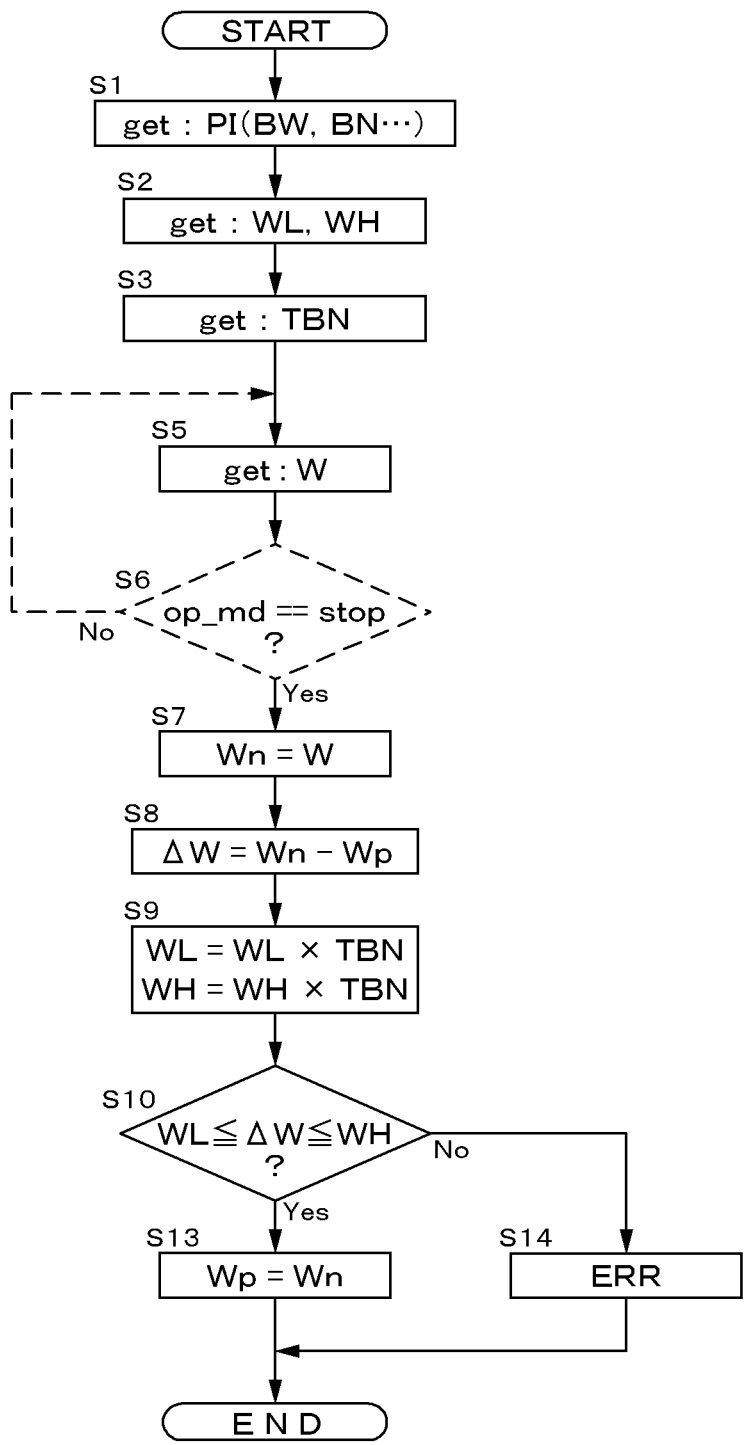

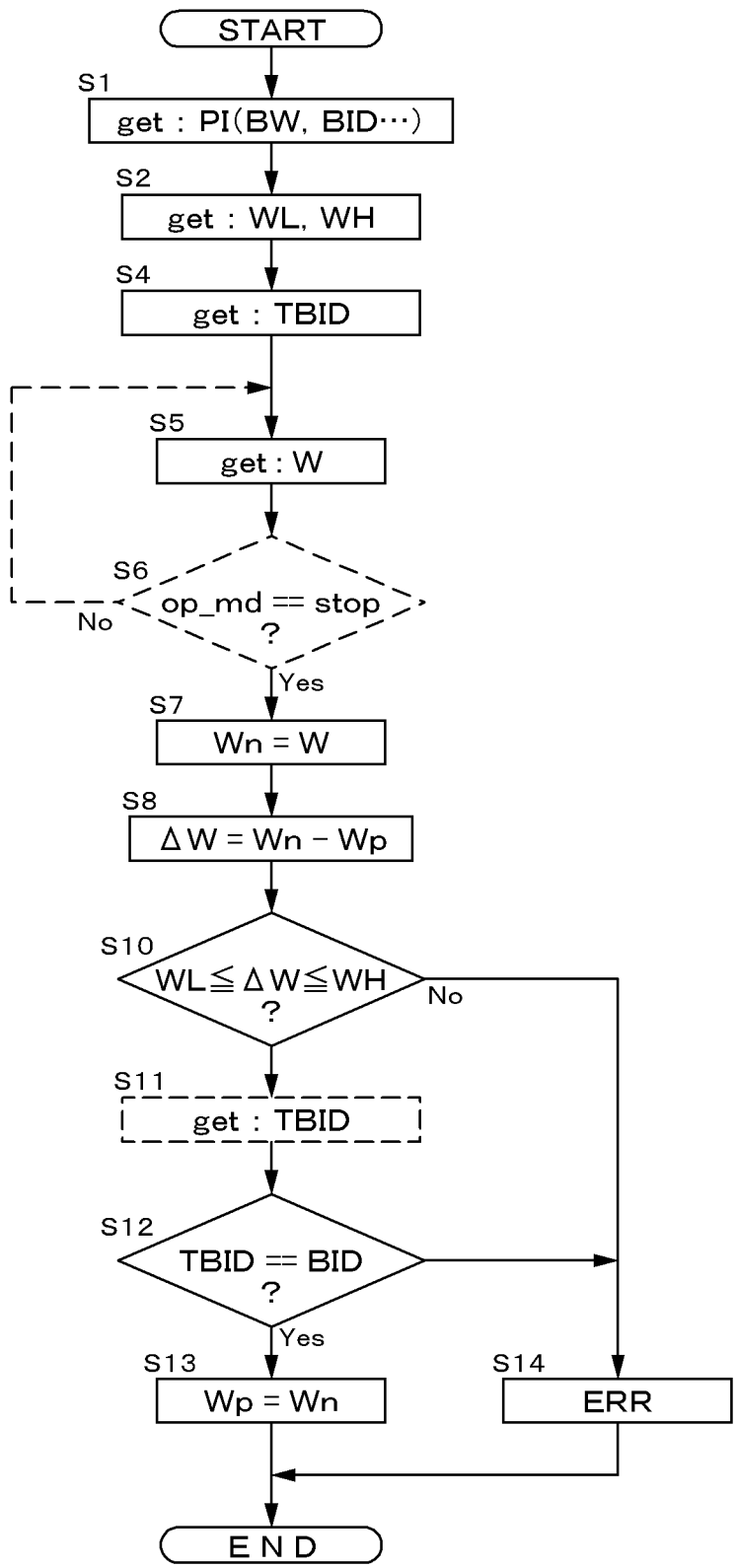

ARTICLE TRANSPORT VEHICLE

CROSS-REFERENCE TO RELATED APPLICATIONS

This application is the United States national phase of International Application No. PCT/JP2019/020871 filed May 27, 2019, and claims priority to Japanese Patent Application No. 2018-108850 filed Jun. 6, 2018, the disclosures of which are hereby incorporated by reference in their entirety.

BACKGROUND OF THE INVENTION

Field of the Invention

The present invention relates to an article transport vehicle for collecting articles from a plurality of accommodating portions that accommodate articles.

Description of Related Art

JP 2008-247546A (Patent Document 1) discloses a picking facility including a picking operation cart (1) with which articles picked up from accommodating shelves (3) are placed into containers that are provided for respective destinations such as shops (reference numbers in parentheses in "Background Art" are those in the reference document). In this facility, while pushing the picking operation cart (1), an operator M moves the cart (1) along the accommodating shelves (3) constituted by a plurality of accommodating portions (5) that accommodate different articles. The operator picks up articles from the accommodating portions (5) based on specifications from a terminal (21) provided on the picking operation cart (1), and places them in containers (8) of the picking operation cart (1). The containers (8) are provided for respective destinations, and thus articles are collected for respective destinations.

An operator picks up articles from target accommodating portions (5) based on specifications from the terminal (21), but, at that time, articles that are different from those specified may be picked up by mistake. In this case, articles including the wrong articles are collected into the containers (8).

Patent Document 1: JP 2008-247546A

SUMMARY OF THE INVENTION

In view of these circumstances, there is a demand for a technique for suppressing the collection of articles that are different from those specified when collecting articles using an article transport vehicle from a plurality of accommodating portions that accommodate articles.

An article transport vehicle according to an aspect in view of the above-described circumstances includes: a traveling portion that travels to a set position, which is set corresponding to each of a plurality of accommodating portions that accommodate articles; a control portion that controls the traveling portion; a support portion that supports at least one article picked up from an accommodating portion; a weight detecting portion that detects a total weight of the at least one article supported by the support portion; and a notifying portion that notifies an operator of picking information indicating a target article, which is an article that is to be picked up from the accommodating portion at the set position, wherein, in a case in which an increased weight, which is an increase in the total weight when an article is newly supported by the support portion, is out of a prescribed range according to a weight of the target article indicated by the picking information, the control portion determines that the target article was not correctly picked up, and makes a notification giving error information.

With the above-described configuration, an article transport vehicle can travel to a set position, an operator can perform a picking operation based on picking information at the set position, and the article transport vehicle can travel to a next destination position in a state in which the picked-up article is kept supported by a support portion. Accordingly, it is possible to properly transport the picked-up article without making the operator move a long distance. Accordingly, it is possible to improve the efficiency of the picking operation. Furthermore, with the above-described configuration, the support portion includes a weight detecting portion that detects a total weight of articles supported by the support portion. It is natural that the amount by which the weight increases when an article is picked up by the operator from an accommodating portion and is placed into a support portion matches the weight of the target article. With the above-described configuration, in the case in which the increased weight is out of a prescribed range according to the weight of the target article, a notification giving error information is made. Accordingly, the operator can check the picked-up article, and replace it with a correct article (target article) if the picked-up article is wrong. In this manner, with the above-described configuration, it is possible to suppress the collection of articles that are different from those specified when collecting articles using an article transport vehicle from a plurality of accommodating portions that accommodate articles.

Further features and advantages of the article transport vehicle will become apparent from the following description of embodiments with reference to the drawings.

BRIEF DESCRIPTION OF THE DRAWINGS

FIG. 7 is a flowchart illustrating an example of control including determination based on an increased weight.
FIG. 8 is a flowchart illustrating another example of control including determination based on an increased weight.
FIG. 9 is a flowchart illustrating an example of control including determination based on an increased weight and identifying information.

DETAILED DESCRIPTION OF PREFERRED EMBODIMENTS

Figure 1:
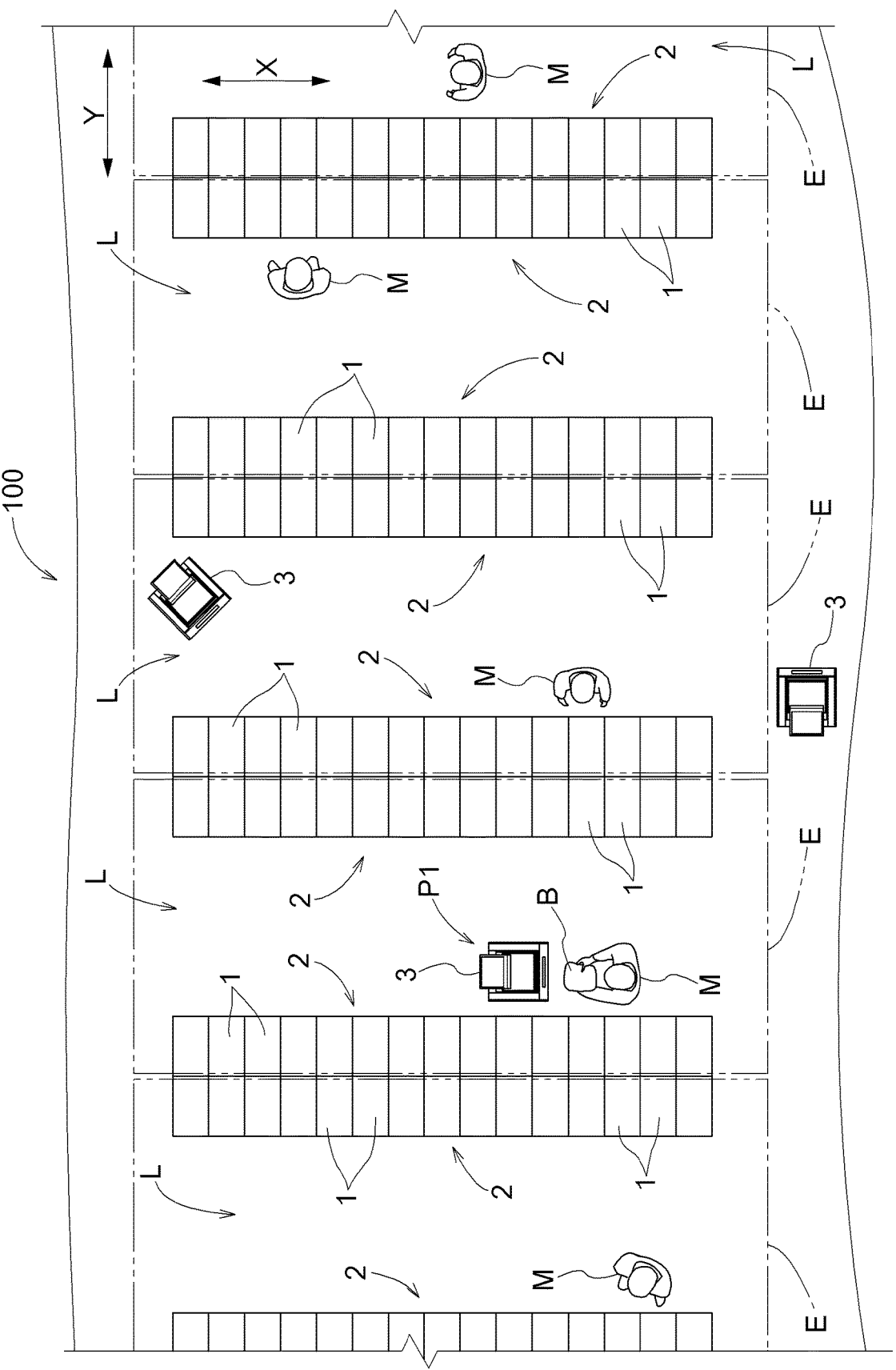
FIG. 1 is a plan view of a picking facility.
Figure 2:
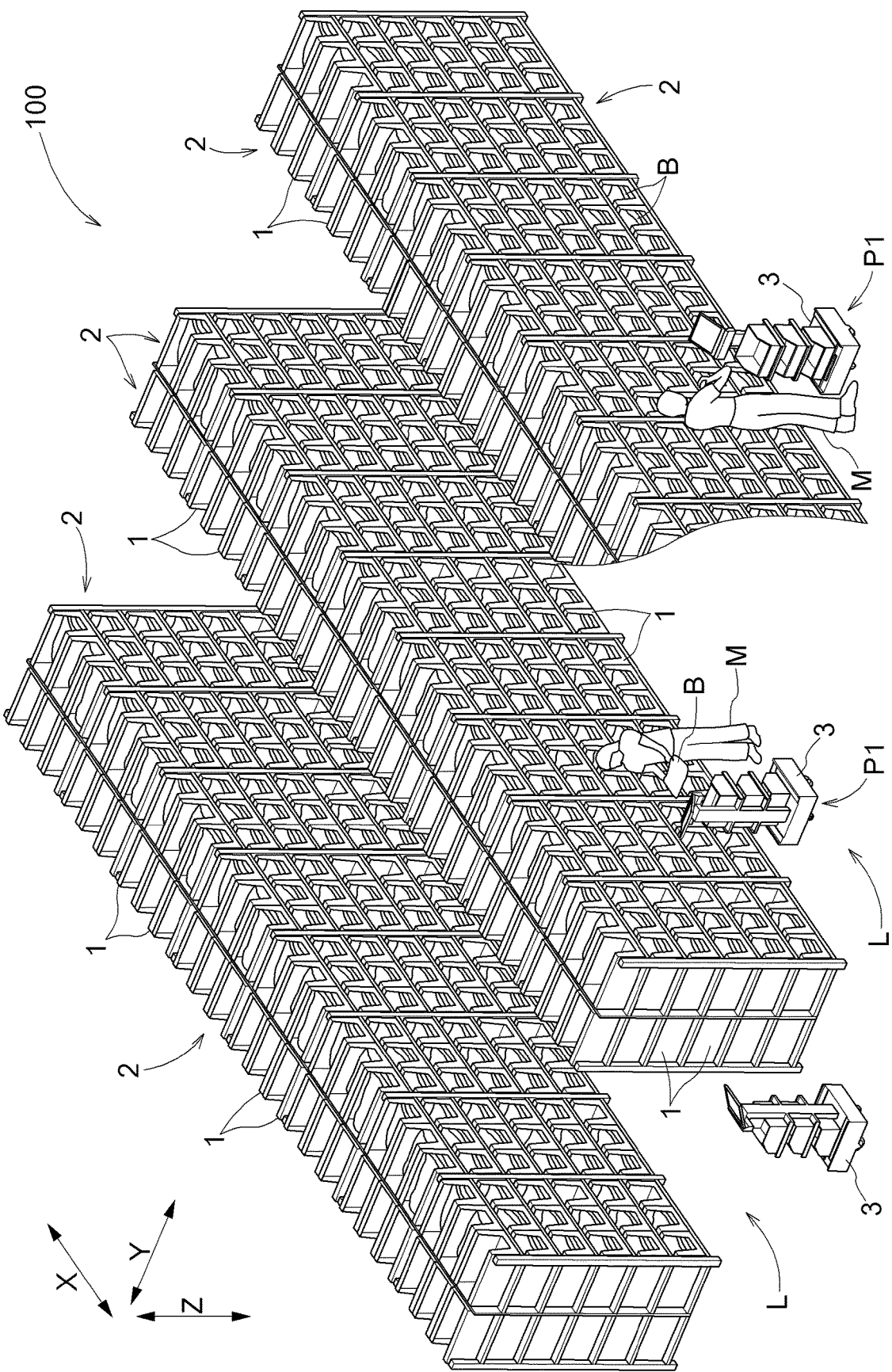
FIG. 2 is a perspective view of the picking facility.
Figure 3:
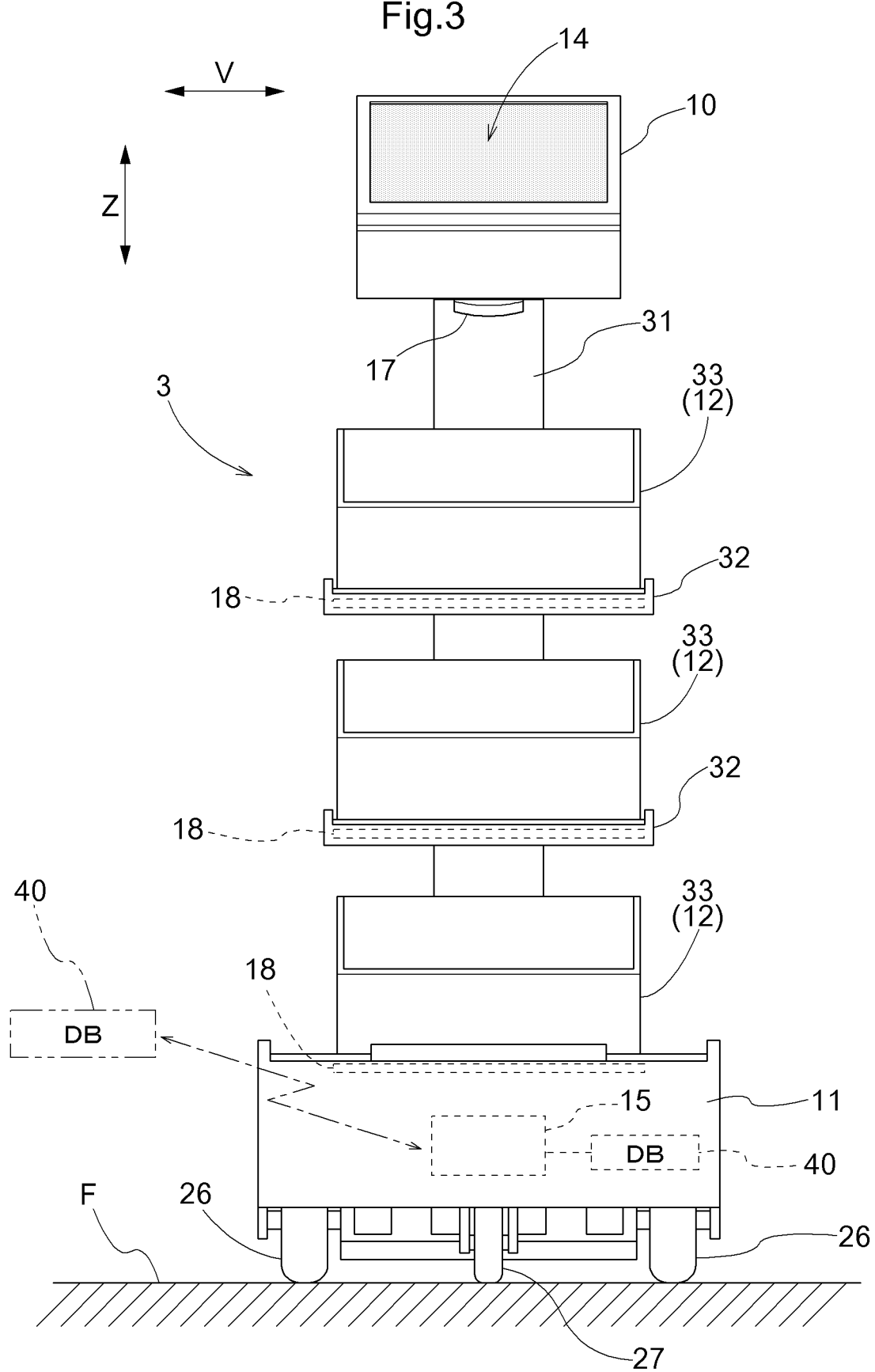
FIG. 3 is a rear view of an article transport vehicle.
Figure 4:
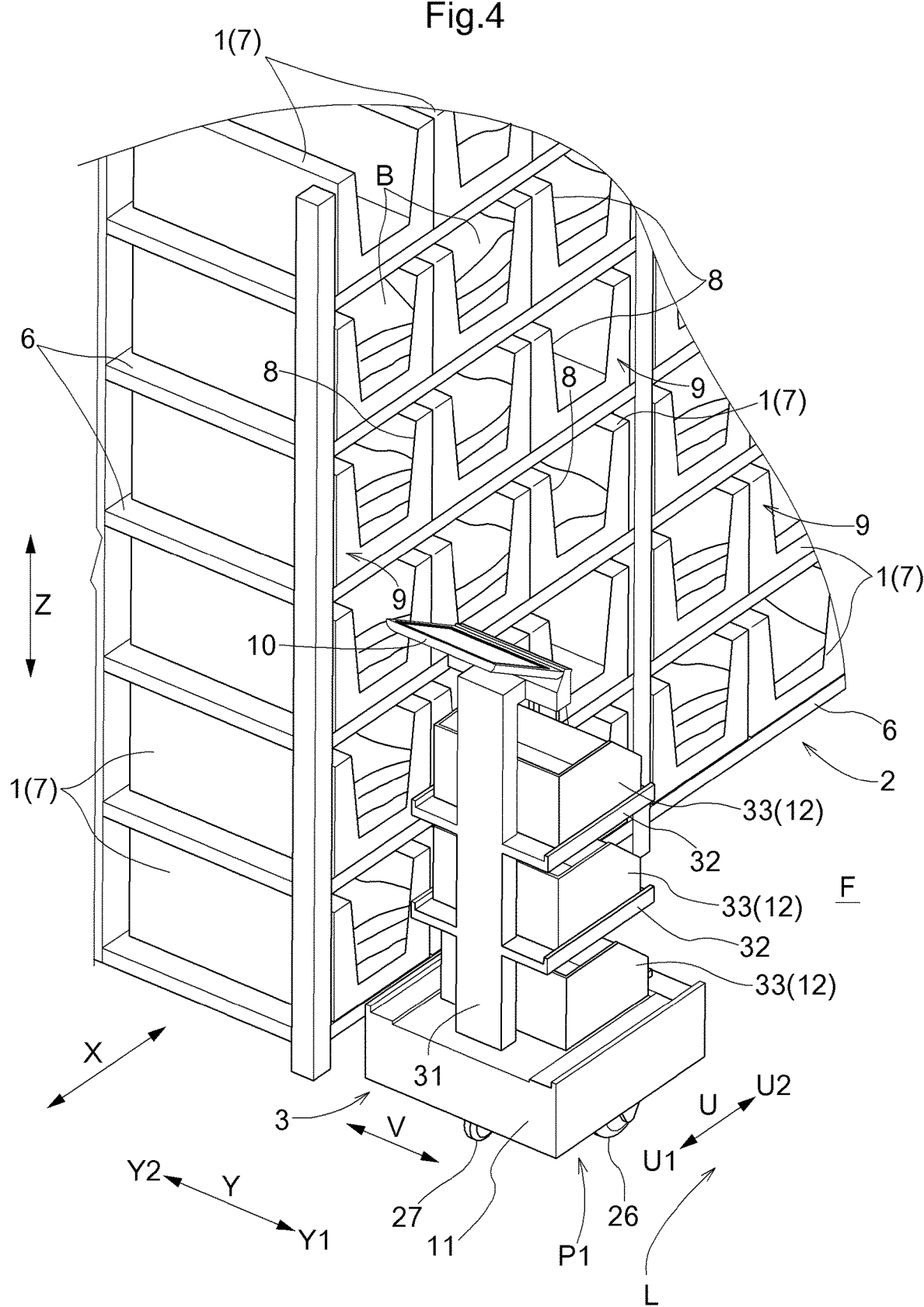
FIG. 4 is an enlarged perspective view of the picking facility and the article transport vehicle.

Hereinafter, an embodiment of an article transport vehicle for use in a picking facility will be described with reference to the drawings. FIG. 1 is a vertical plan view of a picking facility 100 as viewed from above along a vertical direction Z, and FIG. 2 is a perspective view of the picking facility 100 as viewed from diagonally above. FIG. 3 is a rear view (view from a later-described rear side U2) of an article transport vehicle 3, and FIG. 4 is an enlarged perspective view of the picking facility 100 and the article transport vehicle 3. The picking facility 100 includes article accommodating shelves 2 including a plurality of accommodating portions 1 that accommodate articles B, and article transport vehicles 3 that travel on a floor F. Furthermore, as will be described later with reference to FIG. 5, the picking facility 100 also includes a control apparatus H that manages the articles B accommodated in the article accommodating shelves 2, and the article transport vehicles 3. As shown in FIGS. 1 and 2, in the picking facility 100, a plurality of operators M perform a picking operation that collects articles B for respective destinations from a plurality of accommodating portions 1, using the article transport vehicles 3.

Hereinafter, the accommodating portions 1 and the article accommodating shelves 2 will be described while, when viewed from above, the direction in which the accommodating portions 1 of each article accommodating shelf 2 are arranged is taken as a first direction X (arrangement direction), and the direction that is orthogonal to the first direction X on a horizontal plane is taken as a second direction Y. Furthermore, in the relationship with each accommodating portion 1, the direction along the second direction Y from the accommodating portion 1 to a lane L is taken as a lane side Y1, and the direction along the second direction Y from the lane L to the accommodating portion 1 is taken as an accommodating portion side Y2. Regarding each article transport vehicle 3, the direction along the traveling direction when the article transport vehicle 3 travels forward is taken as a front-rear direction U, and the direction that is orthogonal to the front-rear direction U on a horizontal plane is taken as a width direction V. In the front-rear direction U, the side in the traveling direction when the article transport vehicle 3 travels forward is taken as a forward side U1, and the opposite side is taken as a rear side U2.

The article accommodating shelves 2 each include a plurality of accommodating portions 1 that are arranged in the vertical direction Z and the first direction X. Specifically, the article accommodating shelves 2 include a plurality of shelf boards 6 that are arranged at intervals in the vertical direction Z. A plurality of accommodating containers 7 that are arranged in the first direction X are placed on each of the shelf boards 6. That is to say, the plurality of accommodating containers 7 included in the article accommodating shelves 2 respectively constitute the accommodating portions 1. The article accommodating shelves 2 accommodate a plurality of types of articles for respective types, and one accommodating portion 1 (one accommodating container 7) accommodates one type of articles.

As shown in FIG. 4, the accommodating containers 7 as the accommodating portions 1 include opening faces 9 having opening portions 8 through which the articles B are put in and taken out. The accommodating containers 7 are arranged on the article accommodating shelves 2 such that the opening faces 9 face the lane side Y1. A plurality of accommodating portions 1 included in one article accommodating shelf 2 are arranged such that the opening faces 9 face the same direction.

As shown in FIG. 1, the region in which the article accommodating shelves 2 are arranged is divided into a plurality of areas E. Preferably, an operator M in charge is deployed in each of the plurality of areas E. The operator M performs a picking operation that transfers the articles B from the article accommodating shelves 2 to the article transport vehicle 3 in the area E of which he or she is in charge. Furthermore, the operator M may perform a supply operation that transfers the articles B from the article transport vehicle 3 to the article accommodating shelves 2. Note that the relationship between the number of areas E and the number of operators M can be freely changed, and, for example, it is also possible that a plurality of operators M are deployed in one area E, or one operator M is in charge of a plurality of areas E.

The control apparatus H manages the type, the quantity of inventory, and the like of the articles B accommodated in the accommodating portions 1. For example, when a picking instruction to collect the articles B from the article accommodating shelves 2 for respective destinations is output from an upper-level controller, the control apparatus H transmits picking information to a control portion 15 of the article transport vehicle 3. The picking information is information indicating the positions of the accommodating portions 1 from which the operator M is to pick up the articles B through picking operations, or information of the type or the number of articles B that are to be picked up from the accommodating portions 1.

Figure 5:
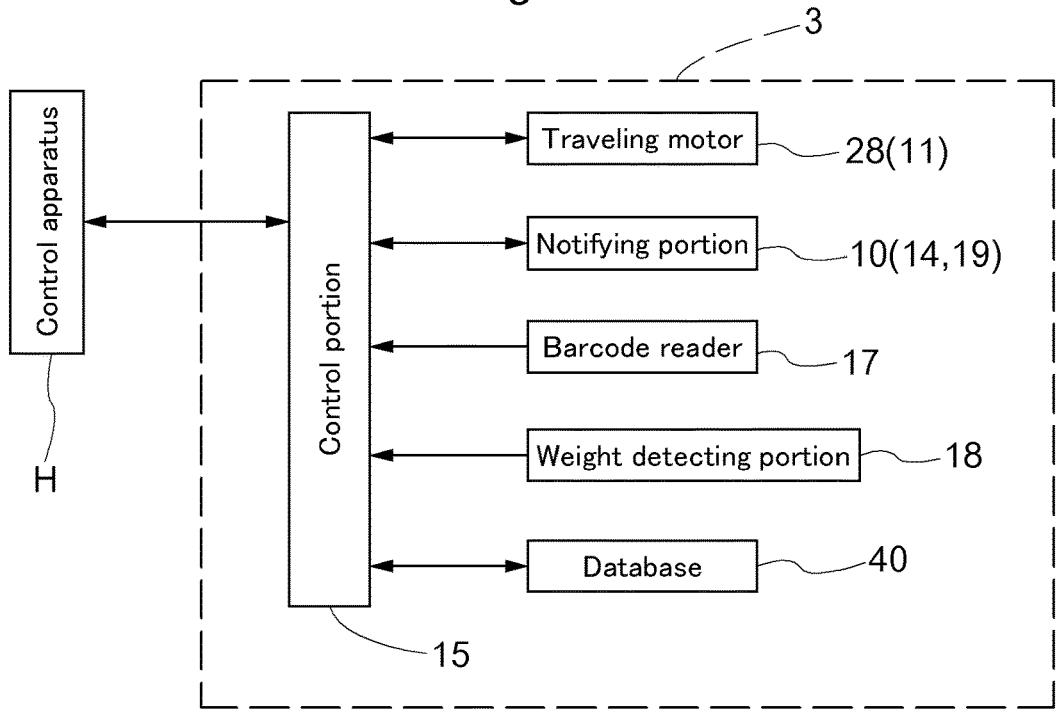
FIG. 5 is a control block diagram.

As shown in FIG. 3, each article transport vehicle 3 includes a traveling portion 11 that travels on the floor F, support portions 12 that support the articles B, a notifying portion 10 that notifies the operator M of picking information, and a control portion 15 that controls at least the traveling portion 11. Furthermore, as shown in FIGS. 3, 5, etc., the article transport vehicle 3 includes a barcode reader 17 that reads a barcode displayed on the articles B, and a weight detecting portion 18 that measures the total weight of the articles B supported by the support portions 12. As will be described later in detail with reference to FIG. 9, the barcode reader 17 corresponds to an identifying information reading portion that reads identifying information BID of the articles B.

The traveling portion 11 includes a pair of traveling wheels 26 that are arranged in the width direction V, driven wheels 27 that are arranged on two sides in the front-rear direction U of the arrangement direction of the pair of traveling wheels 26, and a traveling motor 28 (see FIG. 5) that rotationally drives the traveling wheels 26. The traveling portion 11 travels forward by causing the traveling motor 28 to rotate both of the pair of traveling wheels 26 forward, and travels backward by causing the traveling motor 28 to rotate both of the pair of traveling wheels 26 in reverse. Furthermore, the traveling portion 11 turns by causing the traveling motor 28 to rotate the pair of traveling wheels 26 at different rotational speeds. Note that rotating wheels at different rotational speeds also encompasses rotating the wheels in different rotational directions, and driving only one of the two traveling wheels 26 and stopping the other traveling wheel 26.

Furthermore, a support post 31 is provided standing upright on the traveling portion 11. The support post 31 supports a plurality of support platforms 32 (two support platforms 32, in this example). Furthermore, the upper end of the support post 31 supports the notifying portion 10. The upper face of the traveling portion 11 and the two support platforms 32 respectively support transporting containers 33. In this example, a configuration is described as an example in which the article transport vehicle 3 includes three transporting containers 33, and the transporting containers 33 correspond to the support portions 12 that support the articles B.

The notifying portion 10 includes a display portion 14. As will be described later with reference to FIG. 6, the display portion 14 displays at least a part of picking information PI. For example, the display portion 14 displays information such as the type of target article, which is an article B that is to be picked up from the accommodating portion 1, the number of articles that are to be picked up, a target accommodating portion, which is an accommodating portion 1 from which a target article is to be picked up, and a target support portion, which is a support portion 12 by which a target article is to be supported. Furthermore, the display portion 14 includes a touch panel on which the operator M can operate touch buttons 19. The display portion 14 is arranged such that the display screen faces the rear side U2 and the upper side. In this example, the configuration was described as an example in which the notifying portion 10 includes the display portion 14. However, it is also possible to employ a configuration in which the notifying portion 10 does not include the display portion 14, and, for example, notifies an operator of the picking information PI by a voice or the like.

Upon receipt of picking information from the control apparatus H, the control portion 15 of the article transport vehicle 3 performs control that drives the traveling motor 28, thereby causing the traveling portion 11 to travel to a set position P1, which is set corresponding to each of the plurality of accommodating portions 1 that accommodate the articles B. The control portion 15 causes the article transport vehicle 3 to travel to the set position P1 through autonomous traveling while avoiding obstacles such as the article accommodating shelves 2, the operators M, and the other article transport vehicles 3, based on detection results of an unshown sensor or the like mounted in the article transport vehicle 3. When the article transport vehicle 3 stops at the set position P1, the operator M who is in charge of the area E containing that set position P1 approaches the article transport vehicle 3, and sees the picking information PI displayed on the display portion 14. The picking information PI may contain information that is not displayed on the display portion 14, but the operator M is notified of at least information indicating a target article, which is an article that is to be picked up from the accommodating portion 1 at the set position P1, via the display portion 14.

Figure 6:
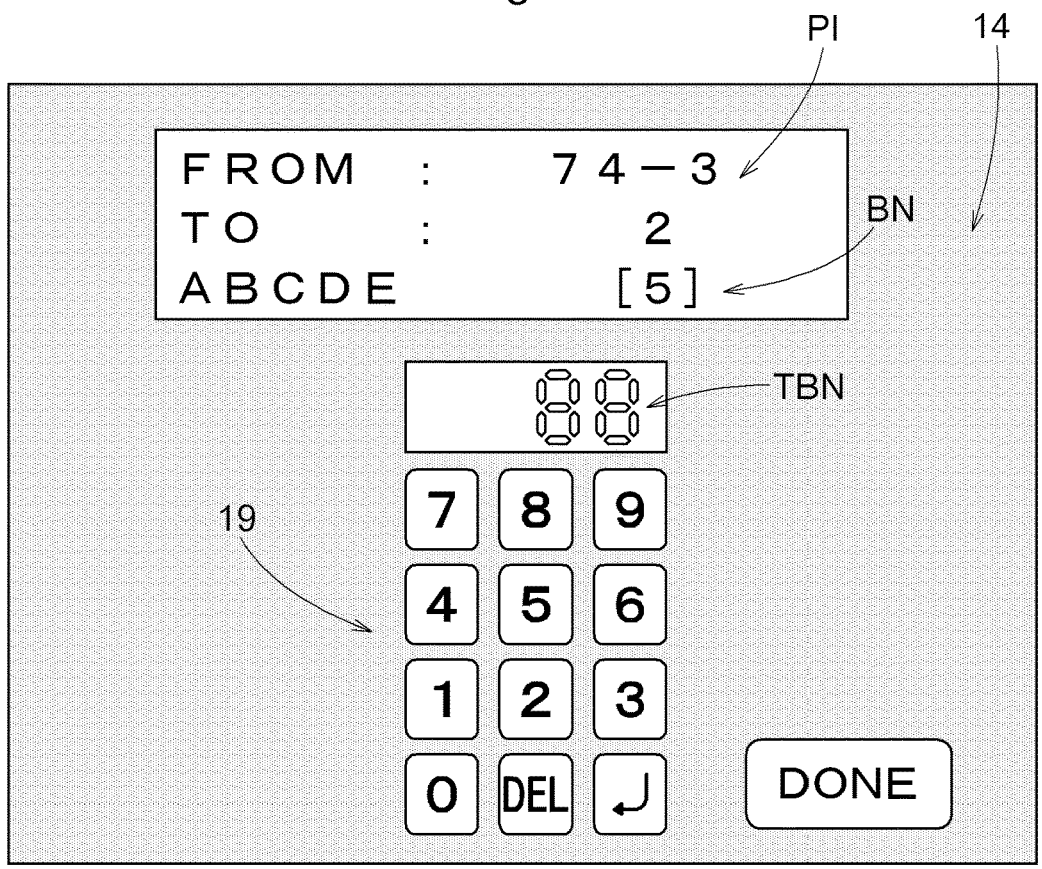
FIG. 6 is a display example of a display portion.

FIG. 6 shows an example of the picking information PI that is displayed on the display portion 14. "FROM" gives a notification of a target accommodating portion from which a target article is to be picked up, and, for example, "74-3" being displayed indicates that the accommodating portion 1 at the $74^{-th}$ column and $3^{-rd}$ row is a target accommodating portion. Furthermore, "TO" gives a notification of a destination of the target article. As described above, the article transport vehicle 3 includes three transporting containers 33, as the support portions 12 that support at least one article B picked up from the accommodating portion 1. In this example, "2" being displayed indicates that the $2^{-nd}$ transporting container 33 from above is a target support portion, which is a support portion 12 allocated for the destination.

A name or a product code of the target article is displayed below "FROM" and "TO". The names or the product codes of the articles B are preferably also displayed on the accommodating containers 7 as the accommodating portions 1, and the operators M can pick up the articles B from the accommodating portions 1 while checking the names or the product codes of target products as well. In this example, a configuration is described as an example in which "ABCDE" is displayed as the name or the product code of a target product. Furthermore, there is a case in which a plurality of the same articles B are picked up from the accommodating portion 1, and thus it is preferable that the number of articles that are to be picked up (necessary number information BN) is displayed together with the name or the product code of the target article. In this example, "5" being displayed indicates that five target articles have to be picked up.

The operator M picks up the article B from the accommodating portion 1 based on the picking information PI displayed on the display portion 14, and causes the transporting container 33 as the support portion 12 to support the article B. When the picking operation of the article B from the accommodating portion 1 into the support portion 12 is completed, for example, the operator M touches the touch button 19 indicating "DONE" that is displayed on the touch panel of the display portion 14. Accordingly, the control portion 15 determines that the operator M has completed the picking operation of the article B into the support portion 12.

As described above, each support portion 12 includes the weight detecting portion 18 that detects the total weight of at least one article B supported by the support portion 12. As will be described later in detail with reference to the flowcharts in FIGS. 7 to 9, the control portion 15 determines whether or not the operator M has correctly picked up the article B based on a detection result of the weight detecting portion 18 after the operator M has completed the picking operation of the article B. Specifically, if an increased weight $\Delta W$, which is an increase in the total weight W when an article B is newly supported by the support portion 12, is out of a prescribed range (WL or more and WH or less) according to the weight of the target article indicated by the picking information PI, the control portion 15 determines that the target article was not correctly picked up, and makes a notification giving error information (S14).

If the target article was correctly picked up, a notification giving error information is not made, and the article transport vehicle 3 moves to a next set position P1 through autonomous traveling based on a next piece of picking instruction. That is to say, in response to the operation by the operator M on the touch button 19 indicating "DONE", the picking operation at the set position P1 is completed, and the article transport vehicle 3 moves to the next set position P1.

Note that the increased weight $\Delta W$ varies according to the weight of the target article. Accordingly, as shown in FIGS. 3 and 5, the control portion 15 is configured so as to be communicable with a database 40 storing weight information BW (see FIG. 7, etc.) indicating the weights of the articles B that are accommodated in the accommodating portions 1. The database may be mounted in each article transport vehicle 3, or may be arranged in the picking facility 100 separate from the article transport vehicle 3 as with the control apparatus H. Furthermore, the communication between the control portion 15 and the database 40 may be wired communication inside the article transport vehicle 3, or wireless communication between the inside and the outside of the article transport vehicle 3. Furthermore, the weight information BW may be contained in the picking information PI, and, in this case, the control apparatus H that transmits the picking information PI functions as the database 40. In any case, the control portion 15 acquires the weight information BW of a target article, and determines whether or not the target article was correctly picked up.

Hereinafter, the procedure in which the control portion 15 determines whether or not the target article was correctly picked up based on the increased weight $\Delta W$ will be described with reference to the flowcharts in FIGS. 7 to 9 as well. In all of the flowcharts in FIGS. 7 to 9, the control portion 15 first receives the picking information PI from the control apparatus H (S1). As described above, upon receipt of the picking information PI (S1), the control portion 15 controls the traveling portion 11 to move the article transport vehicle 3 to the set position P1. However, a description of the procedure for moving the article transport vehicle 3 has been omitted herein, and, in principle, the steps that are performed after the article transport vehicle 3 reaches the set position P1 will be described (in particular, step S4 and the following steps will be described, and steps S2 and S3 may be performed during movement). Furthermore, a description of the operation by the operator M on the touch button 19 indicating "DONE" has been omitted herein.

In the procedure shown in the flowchart in FIG. 7, the picking information PI contains at least the weight information BW of a target article acquired via the database 40. Next, the control portion 15 acquires parameters that prescribe the prescribed range (WL or more and WH or less) according to the weight of the target article, that is, a lower limit WL and an upper limit WH of the weight of the target article (S2). The lower limit WL and the upper limit WH may be acquired from the database 40 in a similar way to that of the weight information BW, or contained in the picking information PI. Furthermore, the control portion 15 may acquire a tolerance value (a tolerance difference or a tolerance ratio) for the weight information BW from the database 40 or the picking information PI, and acquire the lower limit WL and the upper limit WH through calculation. Alternatively, a prefixed tolerance value may be set in the control portion 15, and the control portion 15 may acquire the lower limit WL and the upper limit WH through calculation based on the tolerance value.

When the operator M has completed the picking operation of the article B from the accommodating portion 1 into the support portion 12, the control portion 15 acquires a total weight W (S5). This step may be realized by employing a configuration in which the weight detecting portion 18 detects a total weight W and notifies the control portion 15 of the total weight at a point in time at which the picking operation of the article B is completed, or a configuration in which the weight detecting portion 18 always or regularly detects a total weight W, and the control portion 15 acquires the latest total weight W at a point in time at which the picking operation of the article B is completed.

Note that, if the article transport vehicle 3 is moving (e.g., the traveling portion 11 is traveling) during detection of the total weight W, for example, the detection precision of the total weight W may be lowered due to vibrations or the like. When the operator M picks up the article B from the accommodating portion 1, and causes the support portion 12 to support the article, the article transport vehicle 3 has reached the set position P1 and stopped. However, in consideration of further accuracy, it is preferable that the operation mode op_md of the traveling portion 11 is "stop" when the control portion 15 acquires the total weight W (S6). If the acquired total weight W is a value detected when the traveling portion 11 has stopped, the control portion 15 sets the acquired total weight W to a new total weight Wn (S7). Note that, in the case in which the weight detecting portion 18 can detect the total weight W at sufficient detection precision even when the article transport vehicle 3 is moving, it is not absolutely necessary that the weight detected when the traveling portion 11 has stopped is set to the new total weight Wn. The control portion 15 performs determination as follows based on the new total weight Wn that is a weight detected when the traveling portion 11 has stopped.

A previous total weight Wp, which is the total weight W before the current picking operation at the set position P1, is stored in a storage portion such as a register of the control portion 15 (in the case of a first picking operation for the support portion 12, the previous total weight Wp is zero). The control portion 15 obtains a difference between the previous total weight Wp and the new total weight Wn, thereby calculating an increased weight $\Delta W$ (S8). Next, the control portion 15 determines whether or not the increased weight $\Delta W$ is within the prescribed range (WL or more and WH or less) according to the weight of the target article (S10), and, if the increased weight $\Delta W$ is out of the prescribed range, the control portion 15 determines that the target article was not correctly picked up, and makes a notification giving error information (S14). The error information may be configured such that a message or an image is displayed on the display portion 14 of the notifying portion 10, or such that a voice or the like is output from the notifying portion 10.

In step S10, if the increased weight $\Delta W$ is within the prescribed range, the control portion 15 determines that the target article was correctly picked up, and updates the value of the previous total weight Wp to the value of the new total weight Wn (S13). At the next set position P1, determination is performed based on an increased weight $\Delta W$ according to a difference between the new previous total weight Wp and the total weight W after the operator M has performed the picking operation at the next set position P1.

In the configuration described with reference to the flowchart in FIG. 7, the case was described as an example in which one target article is picked up at one set position P1. However, there is a case in which a plurality of the same target articles are picked up at one set position P1. Hereinafter, a configuration will be described with reference to the flowchart in FIG. 8 in which, when a plurality of target articles are picked up, the control portion 15 determines whether or not the target articles were correctly picked up based on the increased weight $\Delta W$. Note that, in FIG. 8, the steps denoted by the same reference numerals as those in FIG. 7 are similar to those described with reference to FIG. 7, and thus a description thereof has been omitted as appropriate.

In the procedure shown in the flowchart in FIG. 8, the picking information PI contains not only the weight information BW of target articles acquired via the database 40 but also necessary number information BN indicating the number of target articles that are to be picked up from the accommodating portion 1 and placed into the support portion 12 (S1). FIG. 6 shows a configuration as an example in which the necessary number information BN contained in the picking information PI is displayed on the display portion 14.

The control portion 15 acquires a lower limit WL and an upper limit WH of the weight of a target article (S2), and further acquires number information TBN indicating the number of target articles that are to be picked up from the accommodating portion 1 and placed into the support portion 12 (S3). The control portion 15 can acquire the number information TBN from the necessary number information BN of the picking information PI. That is to say, the necessary number information BN contained in the picking information PI can be set as the number information TBN. In this case, the control portion 15 functions also as a quantity acquiring portion that acquires the number information TBN. Furthermore, it is also possible that the operator M who sees the necessary number information BN displayed on the display portion 14 as shown in FIG. 6 inputs the number of articles that are to be picked up from the accommodating portion 1, through operation on the touch buttons 19 of the touch panel. In this case, the number input from the touch buttons 19 is the number information TBN, and the touch panel functions as a quantity acquiring portion that acquires the number information TBN.

The steps from step S5 in which the total weight W is detected by the weight detecting portion 18 to step S8 in which the increased weight ΔW is acquired are as described above with reference to FIG. 7, and thus a description thereof has been omitted. However, in this example, the acquired increased weight ΔW is the amount by which the weight increases when a plurality of target articles are placed into the support portion 12. Meanwhile, the lower limit WL and the upper limit WH of the weight of the target article acquired in step S2 are values based on the weight of a single target article. Accordingly, before it is determined in step S10 whether or not the increased weight ΔW is within the prescribed range, in step S9, the prescribed range is set again according to the weight of a single target article and the number indicated by the number information TBN. As shown in FIG. 8, the lower limit WL is multiplied by the number information TBN, so that a new lower limit WL is set, and the upper limit WH is multiplied by the number information TBN, so that a new upper limit WH is set.

Then, as described above with reference to the flowchart in FIG. 7, it is determined whether or not the increased weight ΔW is within the prescribed range (S10). If the increased weight ΔW is within the prescribed range, the control portion 15 determines that the target articles were correctly picked up, and updates the value of the previous total weight Wp to the value of the new total weight Wn (S13). If the increased weight ΔW is out of the prescribed range, the control portion 15 determines that the target articles were not correctly picked up, and makes a notification giving error information (S14).

Note that, if the number of target articles that are to be picked up from the accommodating portion 1 is one, the number information TBN is "1", and the lower limit WL and the upper limit WH of the weight of the target article acquired in step S2 do not change. Accordingly, also in the case in which the number of target articles that are to be picked up from the accommodating portion 1 is one, the procedure as shown in the flowchart in FIG. 8 may be performed.

In the configuration described with reference to the flowcharts in FIGS. 7 and 8, the configuration was described as an example in which the control portion 15 determines whether or not the target articles were correctly picked up based on the increased weight ΔW. However, it is possible to perform more accurate picking operations by further performing another determination, and determining that the target articles were correctly picked up if the two determination criteria are satisfied.

As described above, the article transport vehicles 3 includes the barcode reader 17 as an identifying information reading portion that reads the identifying information BID of the articles B. In the case in which read information TBID, which is the identifying information BID read by the barcode reader 17 when an article B is newly supported by the support portion 12, does not match the identifying information BID of the target article indicated by the picking information PI, the control portion 15 can determine that the target article was not correctly picked up, even when the increased weight ΔW is within the prescribed range.

The identifying information BID is read with the barcode reader 17, by the operator M moving the barcode of the article B picked up from the accommodating portion 1 closer to the barcode reader 17. Accordingly, there is a case in which the operator M forgets to cause a barcode to be read or the barcode reader 17 fails to read a barcode. Thus, it is preferable that, in the case in which the barcode reader 17 fails to read the identifying information BID when an article B is newly supported by the support portion 12, the control portion 15 determines that the target article was not correctly picked up, even when the increased weight ΔW is within the prescribed range.

Hereinafter, the procedure for performing determination regarding the increased weight ΔW and performing determination regarding the identifying information BID, thereby determining whether or not the target article was correctly picked up from the accommodating portion 1 will be described with reference to the flowchart in FIG. 9. The procedure shown in FIG. 9 shows a configuration as an example in which determination regarding the identifying information BID is added to FIG. 7 showing the procedure of determination based on the increased weight ΔW. In FIG. 9, the steps denoted by the same reference numerals as those in FIG. 7 are similar to those described with reference to FIG. 7, and thus a description thereof has been omitted as appropriate. Although FIG. 9 shows a configuration as an example in which only one target article is picked up for the sake of simplicity, this procedure can be modified such that a plurality of target articles are picked up as shown as an example in FIG. 8.

In the procedure shown in the flowchart in FIG. 9, the picking information PI contains not only the weight information BW of a target article acquired via the database 40 but also the identifying information BID of the target article (S1). As described above, the control portion 15 acquires a lower limit WL and an upper limit WH of the weight of the target article (S2). The operator M picks up the article B from the accommodating portion 1, causes the barcode reader 17 to read a barcode displayed on the article B, and places the article B on the support portion 12. The control portion 15 acquires the read information TBID from the barcode reader 17 (S4). Note that it is also possible to employ a configuration in which the read information TBID read by the barcode reader 17 is stored in a temporary storage portion such as a memory or a register, and is acquired from the temporary storage portion (step S11 indicated by the broken line) before step S10 in which the control portion 15 performs determination regarding the identifying information ID.

Furthermore, in this example, the configuration was described as an example in which the identifying information BID is displayed on the article B as a one-dimensional or two-dimensional barcode, and the identifying information reading portion is realized by the barcode reader 17, but it is also possible that the identifying information BID is displayed on the article B in other forms, and the identifying information reading portion is realized by other configurations. For example, it is also possible that a wireless IC chip or the like that can communicate with a reader through near-field wireless communication is mounted in the article B, and the identifying information BID is stored in the wireless IC chip. In this case, the identifying information reading portion is realized by the wireless IC reader. Furthermore, it is also possible that the identifying information BID is displayed on the article B in text, and an image read by the identifying information reading portion including an image scanner is subjected to character recognition, and thus the identifying information BID is acquired.

The steps from step S5 in which the total weight W is detected by the weight detecting portion 18 to step S8 in which the increased weight ΔW is acquired, and step S10 in which it is determined whether or not the increased weight ΔW is within the prescribed range are as described above with reference to FIG. 7, and thus a description thereof has been omitted. In step S10, if the increased weight ΔW is out of the prescribed range, the control portion 15 determines that the target article was not correctly picked up, and makes a notification giving error information (S14) in a similar way to that in FIG. 7.

On the other hand, if the increased weight ΔW is within the prescribed range, the control portion 15 performs determination regarding the identifying information BID, thereby determining whether or not the target article was correctly picked up. Specifically, the control portion 15 determines whether or not the read information TBID read by the barcode reader 17 matches the identifying information BID of the target article indicated by the picking information PI (S12). In the case in which the read information TBID does not match the identifying information BID, it is determined that the target article was not correctly picked up, even when the increased weight ΔW is within the prescribed range, and makes a notification giving error information (S14). In the case in which the read information TBID matches the identifying information BID, it is determined that the target article was correctly picked up, and the value of the previous total weight Wp is updated to the value of the new total weight Wn (S13). Note that the order of step S10 and step S12 (the pair of steps S11 and S12) may be opposite.

Note that, if the operator M forgets to cause a barcode to be read or the barcode reader 17 fails to read a barcode, the read information TBID is not acquired in step S4. Accordingly, in step S12, the read information TBID does not match the identifying information BID, and a notification giving error information is made (S14). If previously acquired read information TBID is left in a register of the control portion 15 or the like, there may be a case in which the read information TBID accidentally matches the identifying information BID. Accordingly, it is preferable that the read information TBID is reset after step S13 or before step S4. If the read information TBID is reset, it is possible to distinguish the case in which a wrong article B is picked up from the case in which operators M forget to cause a barcode to be read or a reading failure of a barcode occurs.

Summary of Embodiments

The following is a brief description of a summary of the article transport vehicle described above.

An article transport vehicle according to an aspect includes: a traveling portion that travels to a set position, which is set corresponding to each of a plurality of accommodating portions that accommodate articles; a control portion that controls the traveling portion; a support portion that supports at least one article picked up from an accommodating portion; a weight detecting portion that detects a total weight of the at least one article supported by the support portion; and a notifying portion that notifies an operator of picking information indicating a target article, which is an article that is to be picked up from the accommodating portion at the set position, wherein, in a case in which an increased weight, which is an increase in the total weight when an article is newly supported by the support portion, is out of a prescribed range according to a weight of the target article indicated by the picking information, the control portion determines that the target article was not correctly picked up, and makes a notification giving error information.

With the above-described configuration, an article transport vehicle can travel to a set position, an operator can perform a picking operation based on picking information at the set position, and the article transport vehicle can travel to a next destination position in a state in which the picked-up article is kept supported by a support portion. Accordingly, it is possible to properly transport the picked-up article without making the operator move a long distance. Accordingly, it is possible to improve the efficiency of the picking operation. Furthermore, with the above-described configuration, the support portion includes a weight detecting portion that detects a total weight of articles supported by the support portion. It is natural that the amount by which the weight increases when an article is picked up by the operator from an accommodating portion and is placed into a support portion matches the weight of the target article. With the above-described configuration, in the case in which the increased weight is out of a prescribed range according to the weight of the target article, a notification giving error information is made. Accordingly, the operator can check the picked-up article, and replace it with a correct article (target article) if the picked-up article is wrong. In this manner, with the above-described configuration, it is possible to suppress the collection of articles that are different from those specified when collecting articles using an article transport vehicle from a plurality of accommodating portions that accommodate articles.

Furthermore, it is preferable that the control portion is configured so as to be communicable with a database storing weight information indicating weights of the articles that are accommodated in the accommodating portions, and the control portion acquires the weight information of the target article from the database, based on the picking information.

With the above-described configuration, it is possible to acquire proper weight information of the target product. Accordingly, it is possible to precisely compare the weight of the target article and the increased weight. Note that the database may be mounted in the article transport vehicle, or may be an external database separate from the article transport vehicle.

Furthermore, it is preferable that the control portion performs determination based on a weight detected when the traveling portion has stopped.

When the traveling portion is traveling, the detection precision of the weight may be lowered due to vibrations or the like. Accordingly, it is preferable that the control portion determines the increased weight based on the weight detected when the traveling portion has stopped. Note that it is also possible to employ a configuration in which the weight detecting portion detects the weight only when the traveling portion has stopped, or a configuration in which the weight detecting portion detects the weight also when the traveling portion is traveling, and the control portion acquires the weight detected when the traveling portion has stopped.

Furthermore, according to an aspect, it is preferable to further include an identifying information reading portion that reads identifying information of an article, wherein, in a case in which the identifying information read by the identifying information reading portion when an article is newly supported by the support portion does not match the identifying information of the target article indicated by the picking information, the control portion determines that the target article was not correctly picked up, even when the increased weight is within the prescribed range according to the weight of the target article indicated by the picking information.

There may be an article that is not a target article but has a weight that is close to that of the target article. With the above-described configuration, the identifying information of the target article indicated by the picking information and the identifying information read by the identifying information reading portion are further referred to in addition to the increased weight, and thus it is possible to perform more accurate determination.

Furthermore, according to an aspect, it is preferable to further include an identifying information reading portion that reads identifying information of an article, wherein, in a case in which the identifying information reading portion fails to read the identifying information when an article is newly supported by the support portion, the control portion determines that the target article was not correctly picked up, even when the increased weight is within the prescribed range according to the weight of the target article indicated by the picking information.

With the above-described configuration, for example, if the operator does not cause the identifying information reading portion to read identifying information of an article that is newly supported by the support portion or the identifying information reading portion does not properly read the identifying information, a notification giving error information is made. Accordingly, it is possible to more reliably collect correct target articles.

Furthermore, it is preferable to further include a quantity acquiring portion that acquires number information indicating the number of target articles that are to be supported by the support portion, wherein the prescribed range is set according to the weight of a single target article and the number indicated by the number information.

The increased weight varies according to the number of target articles. With the above-described configuration, the prescribed range is set according to the number information acquired by the quantity acquiring portion and the weight of a single target article, and thus it is possible to properly set a prescribed range of the increased weight. Note that the number information may be contained in the picking information, or set by the operator inputting the number of articles picked up from the accommodating portions.

Furthermore, it is preferable that the notifying portion includes a display portion, and displays at least the type and the number of target articles.

With the above-described configuration, the display portion included in the notifying portion displays the type and the number of target articles, and thus the operator can be properly notified of the picking information.

DESCRIPTION OF REFERENCE SIGNS

1: accommodating portion
3: article transport vehicle
7: accommodating container (accommodating portion)
10: notifying portion
11: traveling portion
12: support portion
14: display portion
15: control portion
17: barcode reader (identifying information reading portion)
18: weight detecting portion
33: transporting container (support portion)
40: database
B: article
BID: identifying information
M: operator
P1: set position
PI: picking information
TBID: read information (identifying information read by identifying information reading portion)
TBN: number information
W: total weight
WH: upper limit (upper limit of prescribed range)
WL: lower limit (lower limit of prescribed range)
Wn: new total weight (total weight)
Wp: previous total weight (total weight)
ΔW: increased weight

The invention claimed is:

1. An article transport vehicle comprising:
a traveling portion that travels to a set position, which is set corresponding to each of a plurality of accommodating portions that accommodate articles;
a control portion that controls the traveling portion;
a support portion that supports at least one article picked up from an accommodating portion;
a weight detecting portion that detects a total weight of the at least one article supported by the support portion;
a notifying portion that notifies an operator of picking information indicating a target article, which is an article that is to be picked up from the accommodating portion at the set position; and
an identifying information reading portion that reads identifying information of an article
wherein, in a case in which an increased weight, which is an increase in the total weight when an article is newly supported by the support portion, is out of a prescribed range according to a weight of the target article indicated by the picking information, the control portion determines that the target article was not correctly picked up, and makes a notification giving error information,
wherein, in a case in which the identifying information read by the identifying information reading portion when an article is newly supported by the support portion does not match the identifying information of the target article indicated by the picking information, the control portion determines that the target article was not correctly picked up, even when the increased weight is within the prescribed range according to the weight of the target article indicated by the picking information.

2. The article transport vehicle according to claim 1, wherein the control portion is configured so as to be communicable with a database storing weight information indicating weights of the articles that are accommodated in the accommodating portions, and
wherein the control portion acquires the weight information of the target article from the database, based on the picking information.

3. The article transport vehicle according to claim 1, wherein the control portion performs determination based on a weight detected when the traveling portion has stopped.

4. An article transport vehicle comprising:
a traveling portion that travels to a set position, which is set corresponding to each of a plurality of accommodating portions that accommodate articles;
a control portion that controls the traveling portion;
a support portion that supports at least one article picked up from an accommodating portion;
a weight detecting portion that detects a total weight of the at least one article supported by the support portion;
a notifying portion that notifies an operator of picking information indicating a target article, which is an article that is to be picked up from the accommodating portion at the set position; and
an identifying information reading portion that reads identifying information of an article, wherein, in a case in which an increased weight, which is an increase in the total weight when an article is newly supported by the support portion, is out of a prescribed range according to a weight of the target article indicated by the picking information, the control portion determines that the target article was not correctly picked up, and makes a notification giving error information, and wherein, in a case in which the identifying information reading portion fails to read the identifying information when an article is newly supported by the support portion, the control portion determines that the target article was not correctly picked up, even when the increased weight is within the prescribed range according to the weight of the target article indicated by the picking information.

5. The article transport vehicle according to claim 1, further comprising:

a quantity acquiring portion that acquires number information indicating the number of target articles that are to be supported by the support portion, and wherein the prescribed range is set according to the weight of a single target article and the number indicated by the number information.

6. The article transport vehicle according claim 1, wherein the notifying portion includes a display portion, and displays at least the type and the number of target articles.

7. The article transport vehicle according to claim 2, wherein the control portion performs determination based on a weight detected when the traveling portion has stopped.

8. The article transport vehicle according to claim 2, wherein, in a case in which the identifying information reading portion fails to read the identifying information when an article is newly supported by the support portion, the control portion determines that the target article was not correctly picked up, even when the increased weight is within the prescribed range according to the weight of the target article indicated by the picking information.

9. The article transport vehicle according to claim 3, wherein, in a case in which the identifying information reading portion fails to read the identifying information when an article is newly supported by the support portion, the control portion determines that the target article was not correctly picked up, even when the increased weight is within the prescribed range according to the weight of the target article indicated by the picking information.

10. The article transport vehicle according to claim 1, wherein, in a case in which the identifying information reading portion fails to read the identifying information when an article is newly supported by the support portion, the control portion determines that the target article was not correctly picked up, even when the increased weight is within the prescribed range according to the weight of the target article indicated by the picking information.

11. The article transport vehicle according to claim 2, further comprising:

a quantity acquiring portion that acquires number information indicating the number of target articles that are to be supported by the support portion, and wherein the prescribed range is set according to the weight of a single target article and the number indicated by the number information.

12. The article transport vehicle according to claim 2, wherein the notifying portion includes a display portion, and displays at least the type and the number of target articles.

* * * * *